United States Patent
Yang et al.

(10) Patent No.: US 11,388,598 B2
(45) Date of Patent: Jul. 12, 2022

(54) RECOVER FROM VEHICLE SECURITY BREACH VIA VEHICLE TO ANYTHING COMMUNICATION

(71) Applicant: Intel Corporation, Santa Clara, CA (US)

(72) Inventors: Liuyang Yang, Portland, OR (US); Xiruo Liu, Portland, OR (US); Manoj Sastry, Portland, OR (US); Marcio Juliato, Portland, OR (US); Shabbir Ahmed, Beaverton, OR (US); Christopher Gutierrez, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 137 days.

(21) Appl. No.: 16/721,244

(22) Filed: Dec. 19, 2019

(65) Prior Publication Data

US 2020/0128409 A1  Apr. 23, 2020

(51) Int. Cl.
*G06F 21/00* (2013.01)
*H04W 12/122* (2021.01)
*G06F 13/40* (2006.01)
*H04W 12/00* (2021.01)

(52) U.S. Cl.
CPC .......... *H04W 12/122* (2021.01); *G06F 13/40* (2013.01); *H04W 12/009* (2019.01)

(58) Field of Classification Search
None
See application file for complete search history.

(56) References Cited

U.S. PATENT DOCUMENTS

| | | | | |
|---|---|---|---|---|
| 8,397,063 | B2* | 3/2013 | DiCrescenzo | H04W 12/122 713/158 |
| 10,124,764 | B1* | 11/2018 | Ahmed | H04L 63/1425 |
| 2005/0240378 | A1* | 10/2005 | Smith | H04W 4/024 702/188 |
| 2011/0130916 | A1* | 6/2011 | Mayer | G08G 1/127 701/31.4 |
| 2011/0214178 | A1* | 9/2011 | van den Berg | H04W 4/44 726/22 |
| 2016/0019389 | A1* | 1/2016 | Yan | H04W 12/128 726/23 |
| 2017/0078472 | A1* | 3/2017 | Ricci | H04W 4/48 |
| 2017/0093866 | A1* | 3/2017 | Ben-Noon | H04L 63/10 |
| 2018/0197412 | A1* | 7/2018 | Uchiyama | G08G 1/012 |
| 2018/0295147 | A1* | 10/2018 | Haga | G07C 5/0808 |
| 2019/0356677 | A1* | 11/2019 | Naserian | G01S 3/14 |
| 2019/0356685 | A1* | 11/2019 | Naserian | H04W 4/40 |
| 2020/0177414 | A1* | 6/2020 | Watanabe | H04L 67/12 |
| 2020/0275246 | A1* | 8/2020 | Croft | H04L 63/102 |
| 2020/0413264 | A1* | 12/2020 | Han | H04W 12/68 |

* cited by examiner

*Primary Examiner* — Maung T Lwin
(74) *Attorney, Agent, or Firm* — KDB Firm PLLC

(57) ABSTRACT

Systems, apparatus, methods, and techniques for reporting an attack or intrusion into an in-vehicle network are provided. The attack can be broadcast to connected vehicles over a vehicle-to-vehicle network. The broadcast can include an indication of a sub-system involved in the attack and can include a request for assistance in recovering from the attack. Connected vehicles can broadcast responses over the vehicle-to-vehicle network. The responses can include indications of data related to the compromised sub-system. The vehicle can receive the responses and can use the responses to recover from the attack, such as, estimate data.

7 Claims, 6 Drawing Sheets

RECOVER FROM VEHICLE SECURITY BREACH VIA VEHICLE TO ANYTHING COMMUNICATION

TECHNICAL FIELD

Embodiments described herein generally relate to responding to a detected attack for connected vehicles.

BACKGROUND

Modern vehicles may be configured to communicate with other devices. For example, vehicles may communicate with other vehicles, referred to as vehicle-to-vehicle (V2V) communication. Additionally, vehicles may communicate with roadside infrastructures, referred to as vehicle-to-infrastructure (V2I). Such communication techniques are generally referred to as vehicle-to-anything (V2X) communication.

V2X networks may be multi-hop communication networks and may facilitate the communication of real-time traffic information (e.g., congestion, accidents, construction, etc.) and information associated with individual vehicles (e.g., speed, location, direction of travel, etc.) for various transportation-based use cases, such as accident avoidance and route optimization. Furthermore, with the increasingly complex nature of modern vehicles comes increasingly complex attack vectors. As such, many vehicles are provided with an intrusion detection system (IDS) to detect attacks or "intrusions" into the vehicle.

DETAILED DESCRIPTION

Various embodiments are generally directed to providing recovery mechanisms for detected attacks or intrusions to an in-vehicle network (IVN). In examples, a vehicle may respond to a detected attack by leveraging V2X communication. As used herein, V2X communication or V2X networks includes either V2V or V2I. The particular communication scheme and network may be implied from the context. However, the present disclosure does not differentiate between V2V or V2I but instead uses V2X for simplicity of explanation.

Some modern vehicles are equipped with an intrusion detection system (IDS). An IDS can be arranged to detect intrusions (or attacks) on the local IVN. For example, an IDS can be arranged to detect a malicious ECU masquerading as a valid ECU. In some examples, the vehicle can respond to the detected attack by alerting neighbor vehicles (or other devices) of the attack, via V2X communication. As a specific example, the vehicle may alert neighbor vehicles that misbehavior with respect to a particular subsystem of the ego vehicle is detected and that broadcasts regarding that subsystem may not be trustworthy. As used herein, the term "ego vehicle" refers to the vehicle itself. With some examples, the ego vehicle can respond to the detected attack by requesting help from and/or leveraging broadcasts (e.g., over V2X networks) from neighbor vehicles to recover from the attack. As a specific example, the ego vehicle may use neighbor vehicle broadcasts to estimate or fill in gaps left by the compromised subsystem.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
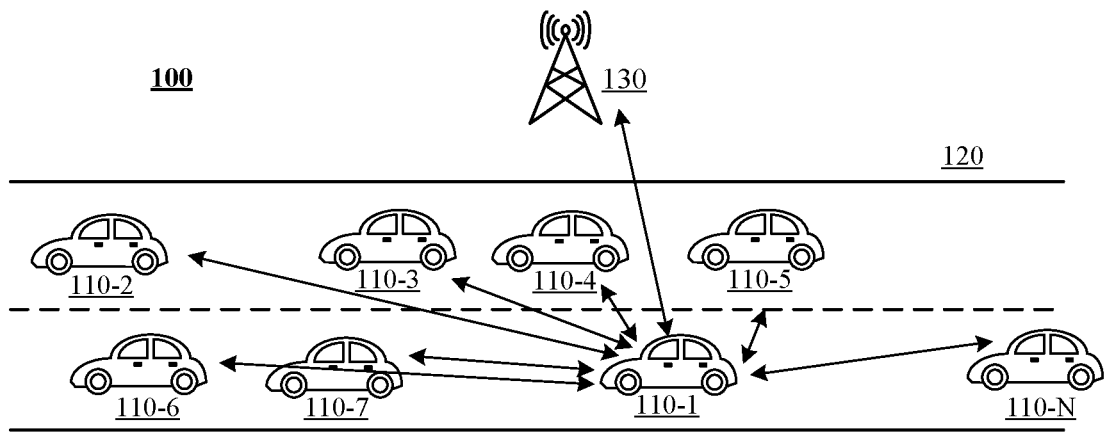
FIG. 1 illustrates a system of vehicles arranged to communicate in a vehicle-to-vehicle network.

FIG. 1 illustrates an example V2X network 100 according to examples of the disclosure. As shown, a number of vehicles 110 are depicted traveling on roadway 120. Particularly, vehicles 110-1, 110-2, 110-3, 110-4, 110-5, 110-6, 110-7, through 110-N, where N is a positive integer are depicted traveling on roadway 120. The vehicles 110 can communicate via any of a variety of V2X communication schemes. Furthermore, a roadside unit (RSU) 130 is depicted. In general, and as explained in greater detail below, the vehicles 110 are equipped with circuitry to facilitate communication between vehicles and/or roadside infrastructure (e.g., RSU 130).

For example, vehicle 110-1 is depicted communicating with the other vehicles 110. It is noted, that although vehicle 110-1 is depicted sending and received messages from the other vehicles 110. With some embodiments, all vehicles 110 can send and receive messages. These messages can include safety notices, movement or behavior alerts, or the like. Examples are not limited in this context. However, for purposes of clarity vehicle 110-1 is used an example vehicle to recover from a detected intrusion based on V2X communication.

Furthermore, vehicles 110 can communicate with RSU 130 via V2X communication. RSU 130 can be any of a variety of devices. In some examples, RSU 130 can be a node in a larger network. Vehicles 110 can communicate via a variety of V2X communication schemes, which may be based on one or more communication standards, such as, for example, the 802.11p Dedicated Short Range Communications standard promulgated by the Institute of Electrical and Electronic Engineers (IEEE), cellular and long-term evolution (LTE) standards promulgated by the $3^{rd}$ Generation Partnership Project (3GPP). Additionally, the messages communicated via V2X networks may be based on one or more standards, such as, SAE J2735, which defines Basic Safety Messages (BSM), among other messages.

Figure 2:
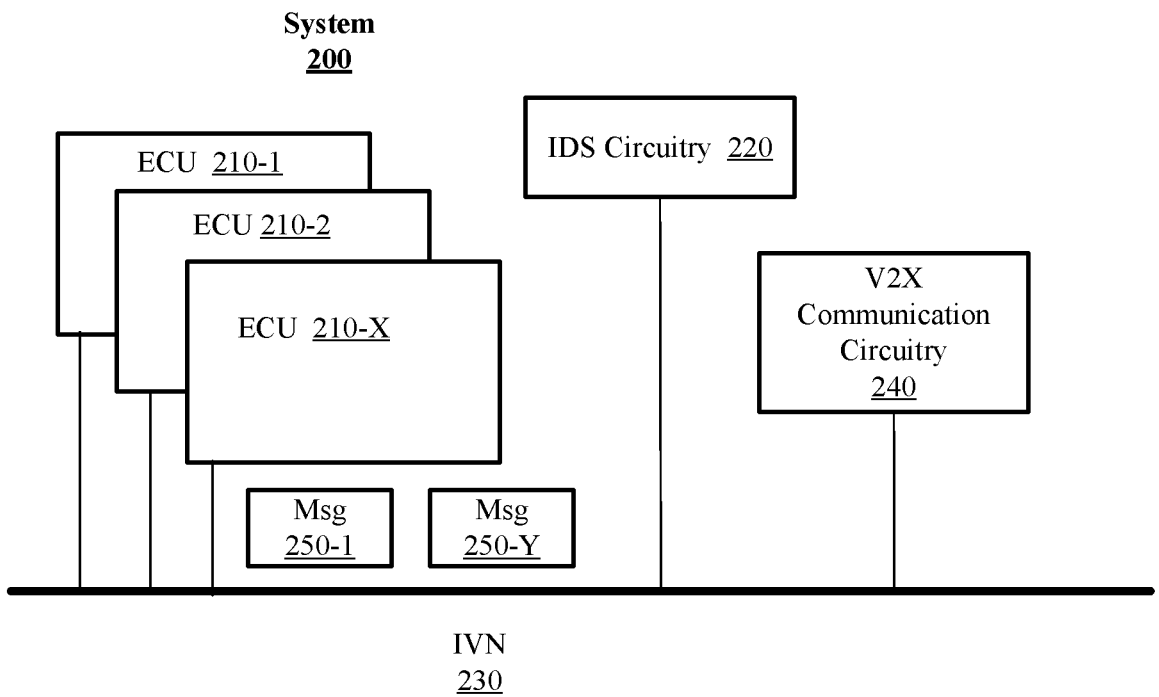
FIG. 2 illustrates a system in a vehicle.

As noted, modern vehicles, such as vehicles 110, may be equipped with an intrusion detection system (IDS). For example, FIG. 2 illustrates a system 200 that can be implemented in one of vehicles 110 of FIG. 1. System 200 includes a number of electronic control units (ECUs) 210 coupled to IDS circuitry 220 via an IVN 230. For example, ECUs 210-1, 210-2 through 210-X are depicted. In some examples, IVN 230 can be a CAN bus, a FlexRay bus, a CAN FD bus, an automotive ethernet bus, or a local interconnected network (LIN) bus, or the like. Furthermore, system 200 includes V2X communication circuitry 240.

In general, ECUs 210 include circuitry arranged to generate and/or consume messages 250 (e.g., messages 250-1 to 250-Y). Messages are communicated via IVN 230 and can include indications of data (e.g., sensor data, or the like) or commands (e.g., actuator commands, or the like). IDS circuitry 220 can be arranged to detect or identify intrusions into IVN 230. For example, one of ECUs 210 can be malicious or "masquerading" as a valid ECU. As a specific example, one of ECUs 210 can be arranged to report a false or misleading vehicle speed in an attempt to compromise the safety of the vehicle 110 in which system 200 is implemented. IDS circuitry 220 can be arranged to identify or detect such malicious behavior. It is noted that a number of IDS schemes can be implemented (e.g., ECU fingerprinting or message fingerprint to name two) and the present disclosure can be arranged independent of the IDS methodology used to identify malicious behavior on the IVN 230.

It is noted, that the disclosure refers to two distinct networks. For example, system 200 includes INV 230 arranged to convey messages 250 between ECUs 210 and/or other sub-systems or components within system 200. Furthermore, V2X communication network (e.g., V2X network 100) is referenced. A vehicles 110 can communicate messages including indications of an attack on the ego vehicle over a V2X network. Care is taken to refer to these separate networks consistently. However, the context should dictate which network is referenced.

V2X communication circuitry 240 can be arranged to broadcast a message (or information element) to other vehicles or RSUs. For example, vehicle 110-1 can broadcast a message to vehicles 110-2 to 110-N including an indication that the IVN 230 of the ego vehicle 110-1 is compromised, and that some specific messages by the ego vehicle 110-1 over the V2X network 100 may not necessarily be relied on by neighbor vehicles 110-2 to 110-N. As another example, vehicle 110-1 can broadcast a message to RSU 130 including an indication that the IVN 230 of the ego vehicle 110-1 is compromised, and that messages by the ego vehicle 110-1 over the V2X network 100 may not necessarily be relied on by neighbor vehicles 110-2 to 110-N.

With some examples, V2X communication circuitry 240 can broadcast a message via V2X network 100 indicating which ECU 210 of the ego vehicle is compromised. For example, if the IDS circuitry 220 detects an ECU 210 is sending malicious speed messages 250 onto IVN 230, V2X communication circuitry 240 can send a messaging comprising an indication that speed data broadcast by the ego vehicle 110-1 may be incorrect.

As a further example, V2X communication circuitry 240 can send a message requesting assistance in recovering from (e.g., estimating, or the like) the detected intrusion. Continuing with the example of an ECU 210 sending malicious speed messages 250, V2X communication circuitry 240 can request speed estimation from adjacent vehicles 110-2 to 110-7 and/or from RSU 130. Vehicle 110-1 can use the messages received via the V2X network 100, including the indications of vehicle speed for vehicles 110-2 to 110-7, to estimate the speed of the ego vehicle 110-1.

Figure 3:
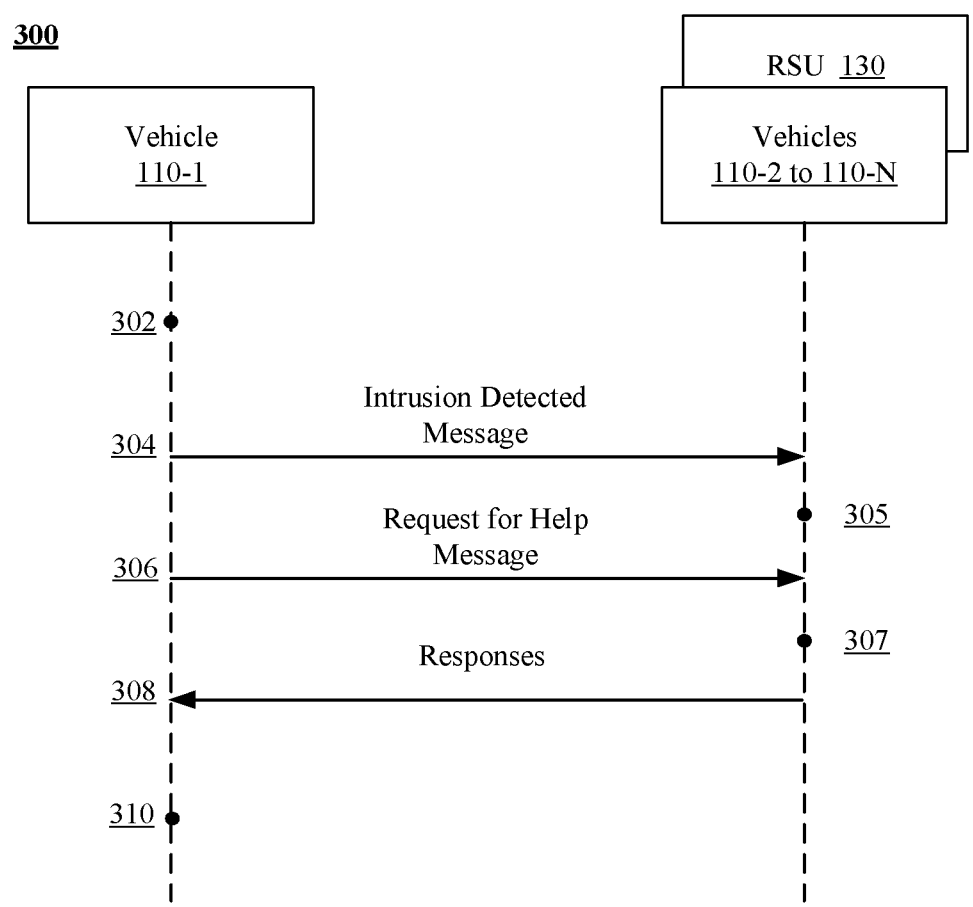
FIG. 3 illustrates a technique to report and recover from an in-vehicle attack via vehicle-to-vehicle communication.

FIG. 3 illustrates an example technique 300 for recovering from an IVN intrusion by leveraging V2X communication. Technique 300 can be implemented by any one of vehicles 110 of FIG. 1. For ease of explanation, vehicle 110-1 of FIG. 1 along with the system 200 of FIG. 2 are used to explain aspects or features associated with the technique 300.

At time 302, the vehicle 110-1 may identify an intrusion into the IVN 230 within the ego vehicle 110-1. For example, intrusion detection circuitry 220 can detect malicious messages 250 or a masquerading ECU 110. Optionally, at time 302, vehicle 110-1 may further determine which data, ECU, or sub-system within system 200 is affected by the intrusion. Particularly, using the example above where an ECU 210 is sending malicious messages 250 with incorrect speed data, intrusion detection circuitry 220 can determine that the speed sensing sub-system within vehicle 110-1 is breached.

At time 304, the vehicle 110-1 can broadcast a message over the V2X network 100 that an intrusion into the IVN 230 of ego vehicle 110-1 has been detected. With some examples, the message broadcast at time 304 can include an indication that the intrusion is limited to a particular sub-system, such as, the speed sensing sub-system. Accordingly, at time 305, devices (e.g., vehicles, RSUs, or the like) receiving the message broadcast by vehicle 110-1 (e.g., vehicles 110-2 to 110-N) can disregard or ignore messages originating from or including data generated by (e.g., indicating speed, or the like) the sub-system of vehicle 110-1 indicated as compromised.

Optionally, at time 306, the vehicle 110-1 can broadcast a request for help message. With some examples, the message broadcast at time 304 can include a request for help. That is, the messages broadcast at time 306 may instead be combined with the message broadcast at time 304. With some examples, the message can include an indication that the V2X communication system is functioning properly and that the request for help can be relied on while indicating which sub-systems or types of data cannot be relied on.

At time 307, vehicles (or RSUs) receiving the messages broadcast by vehicle 110-1 (e.g., vehicles 101-2 through 110-7) can determine a response to the request for help. For example, responsive to a message broadcast by vehicle 110-1 including an indication that the speed sensing sub-system of ego vehicle 110-1 is compromised and a request for help in determining the speed of ego vehicle 110-1, vehicles 110-2 to 110-N can generate a message indicating their own speed or indicating an estimate of the speed of vehicle 110-1.

At time 308, the vehicle 110-1 can receive a response from vehicles 110-2 to 110-N (or RSU 130, or the like). For example, vehicle 110-1 can receive messages broadcast from vehicles 110-2 to 110-N. Using the speed sensing sub-system example, vehicle 110-1 can receive messages from vehicles 110-2 to 110-N indicating a speed of the vehicles 110-2 to 110-N. At time 310, the vehicle 110-1 can use data in the response(s) received from vehicles 110-2 to 110-N to recover from (e.g., estimate compromised data, or the like) the detected attack. As a specific example, vehicle 110-1 can use the speed of vehicles 110-2 to 110-N (e.g., received via V2X network at time 308, or the like) to estimate the speed of ego vehicle 110-1.

Figure 4:
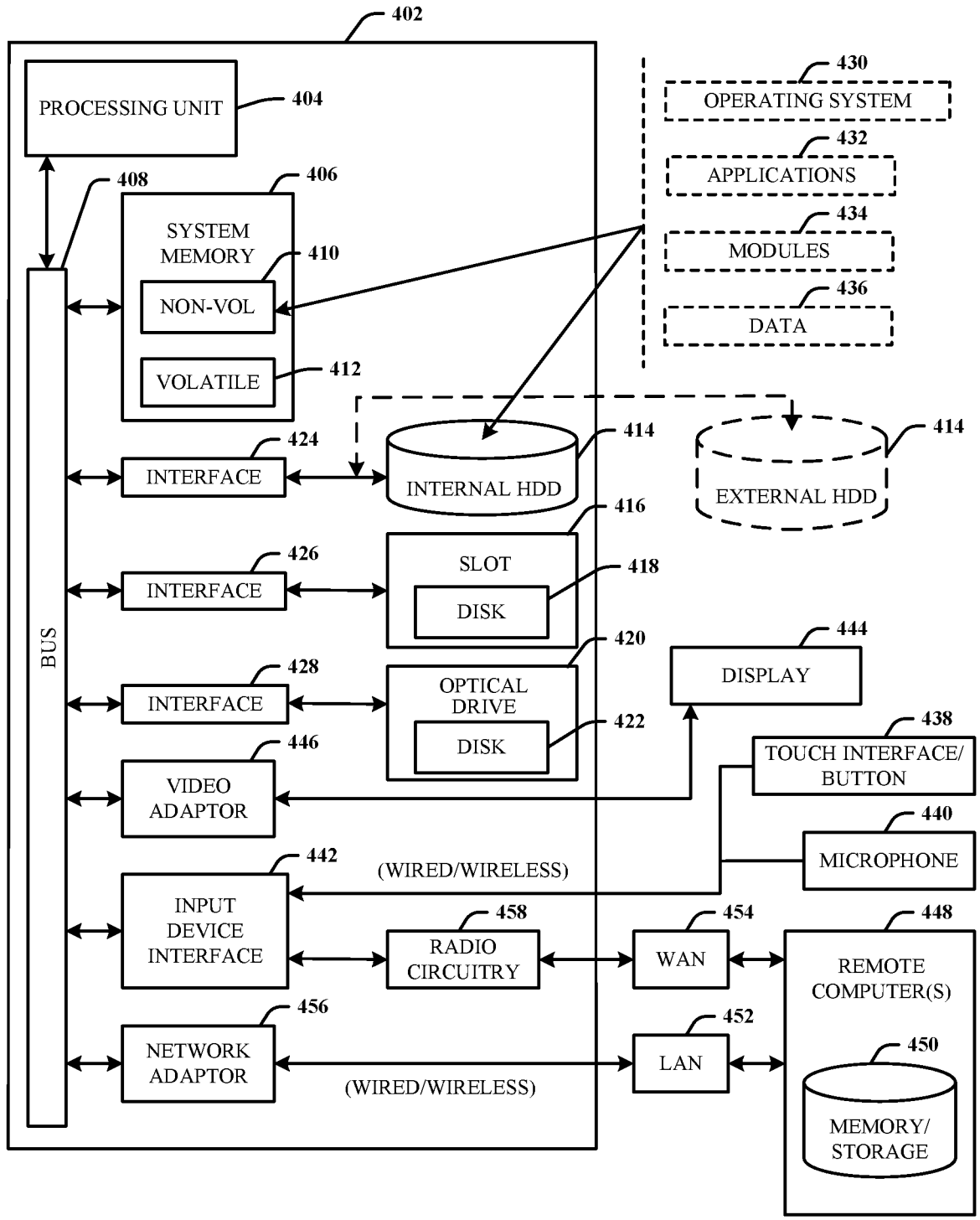
FIG. 4 illustrates an example computing architecture.

FIG. 4 illustrates an example computing architecture 400 (e.g., of a computing device, such as a computer, laptop, tablet computer, mobile computer, smartphone, vehicle-based computing system, etc.) suitable for implementing various embodiments as described herein. Moreover, the computing device may be a computing device in a vehicle. In one embodiment, the computing architecture 400 may include or be implemented as part of a system, which will be further described herein. In examples, the computing architecture 400 of the one or more computing devices and the processing circuitries thereof may be configured as components of a vehicle, such as, one of vehicles 110.

As used in this application, the terms "system" and "component" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical, magnetic, solid state storage mediums), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces (e.g., an IVN, or the like).

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in this figure, the computing architecture 400 includes a processing unit 404, a system memory 406 and a system bus 408. The processing unit 404 can be any of various commercially available processors.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a solid state memory slot (SLOT) 416 to read from or write to a removable disk 418, and an optical disk drive 420 to read from or write to a removable optical disk 422 (e.g., a CD-ROM, DVD, Blue-Ray). The HDD 414, SLOT 416 and optical disk drive 420 can be connected to the system bus 408 by a HDD interface 424, an SLOT interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components of the system 700.

A user can enter commands and information into the computer 402 through one or more wire/wireless input devices, for example, a touch interface or a input button 438 and a voice interface, such as a microphone 440. Other input devices may include switches, infra-red (IR) remote controls, radio-frequency (RF) remote controls, game pads, stylus pens, card readers, dongles, finger-print readers, gloves, graphics tablets, joysticks, keyboards, retina readers, trackballs, track pads, sensors, styluses, and the like. These and other input devices are often connected to the processing unit 404 through an input device interface 442 that is coupled to the system bus 408, but can be connected by other interfaces such as a parallel port, IEEE 1394 serial port, a USB port, an IR interface, Bluetooth, and so forth.

A display 444 or other type of display device is also connected to the system bus 408 via an interface, such as a video adaptor 446. The display 444 may be internal or external to the computer 402. In addition to the display 444, a computer typically includes other peripheral output devices, such as speakers, printers, and so forth.

The computer 402 may operate in a networked environment using logical connections via wire and/or wireless communications to one or more remote devices such as a remote computer 448. The remote computer 448 can be a vehicle, an RSU, a workstation, a server computer, a router, a personal computer, portable computer, microprocessorbased entertainment appliance, a peer device or other common network node, and typically includes many or all of the elements described relative to the computer 402, although, for purposes of brevity, only a memory/storage device 450 is illustrated.

The logical connections depicted include wire/wireless connectivity to a local area network (LAN) 452 (e.g., V2X network, or the like) and/or larger networks, for example, a wide area network (WAN) 454 (e.g., the Internet, or the like). When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a radio circuitry 458, or is connected to a communications server on the WAN 454, or has other means for establishing communications over the WAN 454, such as by way of the Internet. The radio circuitry 458, which can be internal or external and a wire and/or wireless device, connects to the system bus 408 via the input device interface 442.

The computer 402 is operable to communicate with wire and wireless devices or entities using the IEEE 802 family of standards, such as wireless devices operatively disposed in wireless communication (e.g., IEEE 802.11 over-the-air modulation techniques). This can include a number of wireless standards, such as, Wi-Fi, WiMax, Bluetooth, V2X standards, among others. Thus, the communication can be a predefined structure as with a conventional network or simply an ad hoc communication between at least two devices.

The various elements of computing device may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), graphics processing units (GPU), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 5:
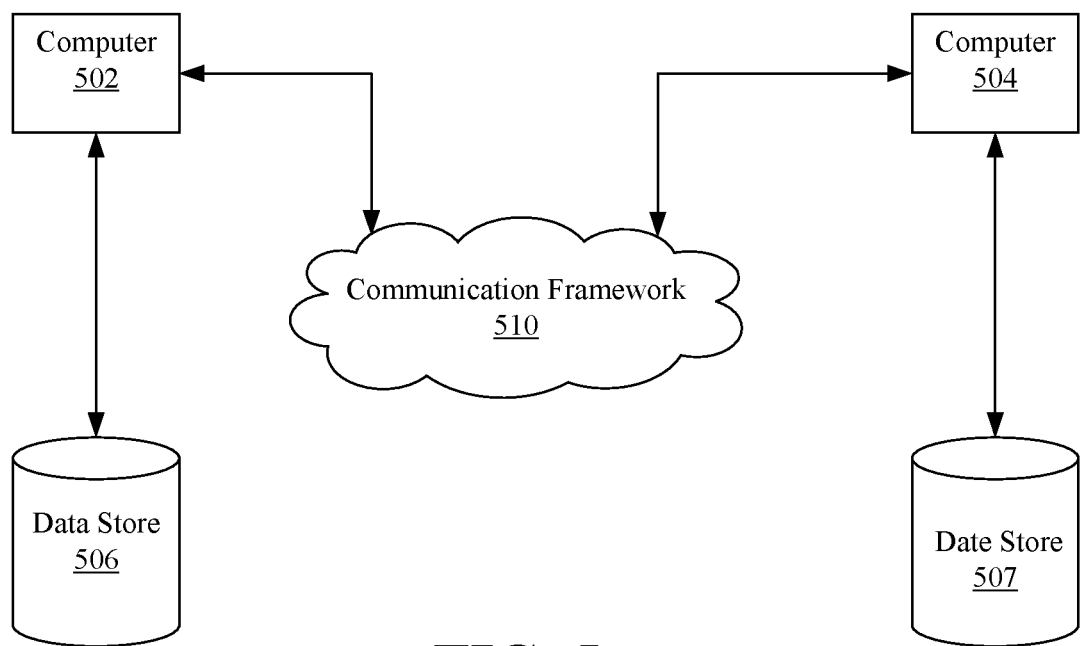
FIG. 5 illustrates an example communications architecture.

FIG. 5 illustrates an exemplary communications architecture 500 suitable for implementing various embodiments. For example, one or more computing devices may communicate with each other via a communications framework 510, which may be a network implemented to facilitate V2X communications, for example, to report and/or recover from in-vehicle attacks are described herein.

The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500.

As shown in FIG. 5, the communications architecture 500 includes a computer 502 and a computer 504, which are operatively connected to one or more respective client data stores 506 and 507 that can be employed to store information local to the respective computers 502 and servers 504, such as cookies and/or associated contextual information. Furthermore, computers 502 and 504 may be like, or include features like, computing architecture 400.

Computers 502 and 504 may communicate information between each other using a communication framework 510 (e.g., V2X network framework, or the like). In one example, computer 502 may be implemented or configured in an RSU, and further, computer 504 may be implemented or configured in a vehicle. The communications framework 510 may implement any well-known communications techniques and protocols. The communications framework 510 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 510 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 502 and 504. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 6:
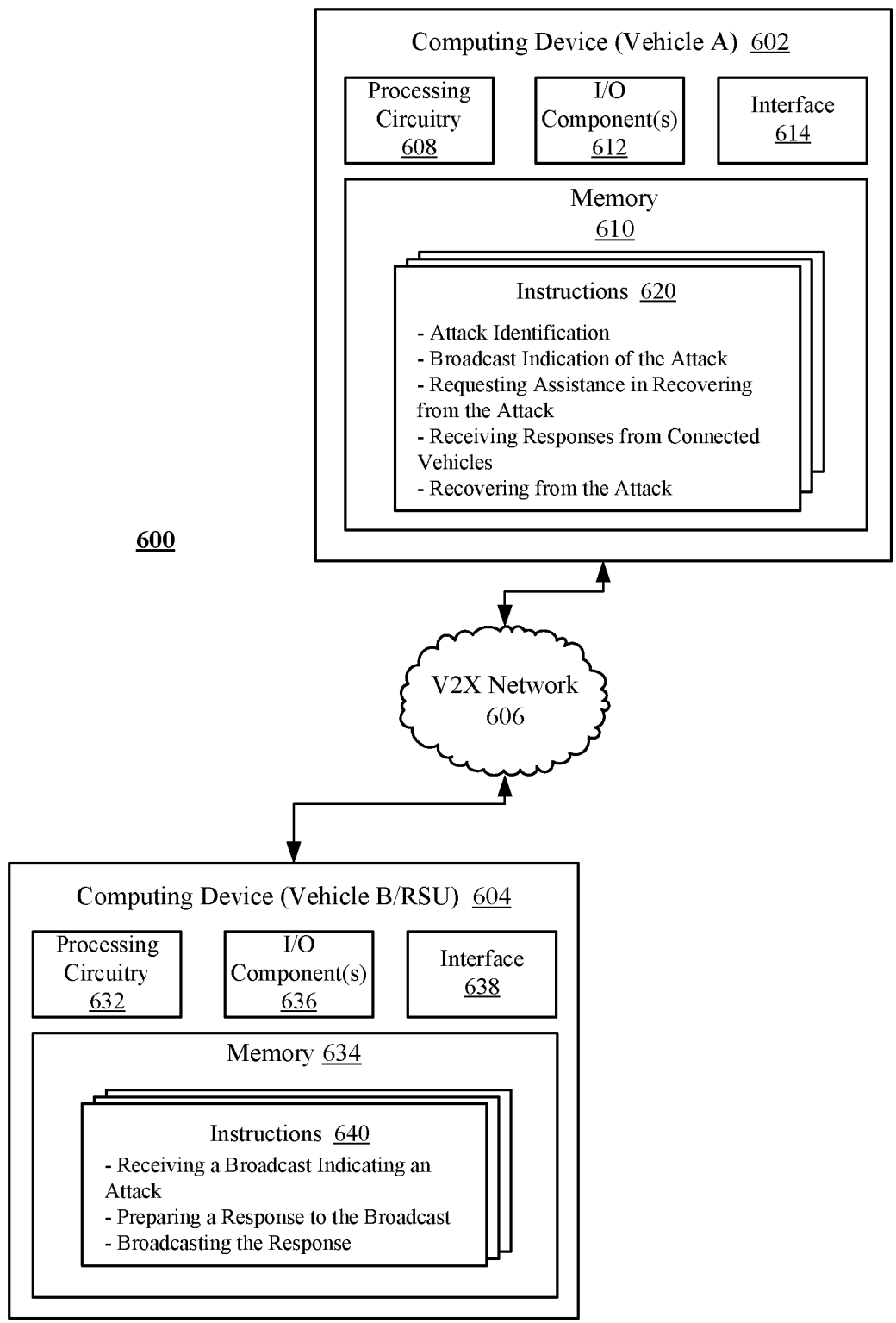
FIG. 6 illustrates an example system.

FIG. 6 illustrates an example system 600 for reporting and/or recovering from an in-vehicle attack via V2X communication according to embodiments of the present disclosure. As shown, system 600 includes at least one computing device 602 implemented at a first vehicle and at least one computing device 604 implemented at a second vehicle or an RSU, both of which may be connected to each other via V2X network 606. Additional (although not shown) computing devices corresponding to other vehicles may also be connected to the first vehicle computing device 602 via the V2X network 606. In examples, network 606 could be a local area network (LAN), a wide area network (WAN), or a cellular network (e.g., LTE, 3GPP, or the like). In some embodiments, V2X network 606 could include the Internet. In other implementations, network 606 can be an ad-hock network or a peer-to-peer (P2P) network based on one or more V2X standards.

As illustrated, the computing device vehicle 602 may include processing circuitry (e.g., a processor) 608, memory 610, I/O component(s) 612, and interface 614. Memory 610 may store one or more instructions 620 for reporting and/or recovering from an in-vehicle attack based on communicating with one or more vehicles (e.g., computing device vehicle 604) via network 606. For example, instructions 620 may include instructions for identifying an attack (e.g., intrusion into IVN, masquerading ECU, or the like), broadcasting an indication of the attack (e.g., transmitting a wireless message including an indication of the attack, an indication of the type of attack, an indication of the sub-system affected by the attack, or the like), requesting assistance in recovering from the attack, receiving responses from connected vehicles (e.g., receiving information elements including indications of data related to the attacked sub-system, speed, or the like), and recovering from the attack (e.g., estimating data related to the attacked sub-system, estimating speed based on responses from connected vehicles, or the like). Information in the memory 610 and other information stored therein may be accessible by or provided to the processing circuitry 608.

As further illustrated in FIG. 6, the computing device 604 may include processing circuitry 632, memory 634, I/O components 636, and interface 638. Similar to memory 610 of first vehicle computing device 602, memory 634 may store various data or information, such as instructions 640, for receiving broadcasts including an indication of an attack on a connected vehicle (e.g., wirelessly receiving a message including an indication of the attack, an indication of the type of attack, an indication of the sub-system affected by the attack, or the like), preparing a response to the broadcast (e.g., generating a message including an indication of data related to the attacked sub-system, or the like), and broadcasting the response (transmitting a wireless message including an indication of data related to the attacked sub-system, or the like).

It may be understood that at least portions of the instructions 640 may be provided by the first vehicle computing device 602. Moreover, the instructions and data stored in memory 634 may be executable or executed by the processing circuitry 632. Other information stored in memory 634 may also be accessible by or provided to the processing circuitry 632. As illustrated in FIG. 6, it may further be understood that multiple sets of instructions 620 may be included in memory 610 and multiple sets of instructions 640 may be included in memory 634.

According to examples, the processing circuitry 608 may include circuitry or processor logic, such as, for example, any of a variety of commercial processors. In some examples, they may include multiple processors, a multi-threaded processor, a multi-core processor (whether the multiple cores coexist on the same or separate dies), and/or a multi-processor architecture of some other variety by which multiple physically separate processors are in some way linked.

The memories 610 and/or 634 may include logic, a portion of which includes arrays of integrated circuits, forming non-volatile memory to persistently store data or a combination of non-volatile memory and volatile memory. It is to be appreciated, that the memories 610 and/or 634 may be based on any of a variety of technologies. In particular, the arrays of integrated circuits included in the memories may be arranged to form one or more types of memory, such as, for example, dynamic random access memory (DRAM), NAND memory, NOR memory, or the like.

The I/O component(s) 612 and/or 636 may include one or more components to provide input to or to provide output from the client computing device 602 and/or the validator computing device 604. For example, the I/O component(s) 612 and/or 636 may be a keyboard (hardware, virtual, etc.), mouse, joystick, microphone, track pad, button, touch layers of a display, a heads-up display, haptic feedback device, camera, microphone, speaker, or the like.

Interfaces 614 and/or 638 may include logic and/or features to support a communication interface. For example, they may include one or more interfaces that operate according to various communication protocols or standards to communicate over direct or network communication links. Direct communications may occur via use of communication protocols or standards described in one or more industry standards (including progenies and variants). For example, the interfaces 614 and/or 638 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Figure 7:
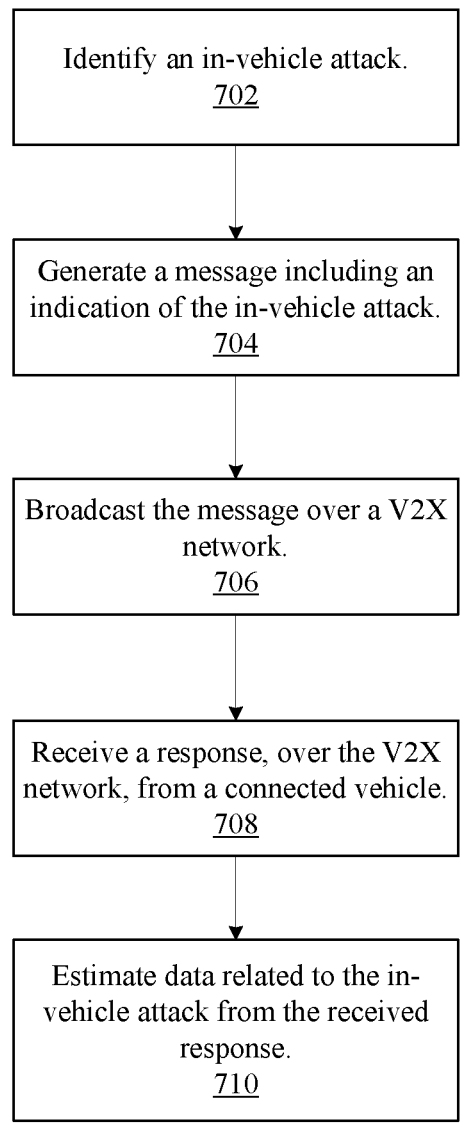
FIG. 7 illustrates an example flow diagram.

FIG. 7 illustrates an example flow diagram 700 according to embodiments of the present disclosure. It may be understood that the features described in each block may be executed by processing circuitry, such as, processing circuitry in a vehicle (e.g., vehicle 110-1 or FIG. 1, or the like). Further, it may be understood that the blocks are not required to be performed in any specific order.

At block 702, an in-vehicle attack may be identified. For example, an intrusion into an IVN may be detected. As another example, a malicious ECU masquerading as an authentic ECU can be detected. As another example, malicious messages on an IVN may be detected. As a specific example, IDS circuitry 220 of system 200 (e.g., as implemented in vehicle 110-1, or the like) can detect an attack or intrusion into IVN 230.

At block 704, a message including an indication of the in-vehicle attack may be generated. For example, an information element including an indication of the attack can be generated. With some examples, the information element can include an indication of the sub-systems (e.g., speed sensing, collision avoidance, etc.) affected by the attack. In other examples, the information element can include an indication that broadcasts related to the attacked sub-system should not be trusted. In further examples, the information element can include a request for assistance in recovering from the attack (e.g., a request for data related to the affected sub-system from connected vehicles, or the like). As a specific example, V2X communication circuitry 240 can generate an information element for broadcast over a V2X network (e.g., network 606, or the like). At block 706, the message can be broadcast over a V2X network. For example, the message generated at block 704 can be broadcast over a V2X network. As a specific example, V2X communication circuitry 240 of system 200 (e.g., as implemented in vehicle 110-1, or the like) can broadcast an information element including indications of the generated message to connected vehicles or RSUs (e.g., vehicles 110-2 to 110-N, RSU 130, or the like) via a V2X network (e.g., V2X network 606, or the like).

At block 708, a response from a connected vehicle (or RSU) can be received via the V2X network. For example, information elements, including response data, can be received from a number (e.g., one or more) connected vehicles. The response can be received over the V2X network. As a specific example, V2X communication circuitry 240 of system 200 (e.g., as implemented in vehicle 110-1, or the like) can receive responses from connected vehicles (e.g., vehicles 110-2 to 110-N, RSU 130, or the like) over a V2X network (e.g., V2X network 606, or the like).

At block 710, data related to the affected sub-system can be estimated. Said differently, recovery from the attack can be facilitated based on data received over the V2X network at block 708. For example, data related to an affected sub-system can be estimated based on data received from connected vehicles. As a specific example, IDS circuitry 220 of system 200 (e.g., as implemented in vehicle 110-1, or the like) can estimate data related to the attack identified at block 702. For example, where the attack is messages 250 on IVN 230 including untrusted speed data, IDS circuitry 220 can estimate the speed of the vehicle 110-1 based on responses received at block 708 (e.g., speed of connected vehicles, or the like). In some examples, IDS circuitry 220 can estimate data related to the attacked sub-system and communicate the estimated data to ECUs 210. For example, via side band communication or via the IVN 230.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1

An apparatus, comprising: processing circuitry; and memory coupled to the processing circuitry, the memory comprising instructions that when executed by the processing circuitry cause the processing circuitry to: receive a notification of an attack on an in-vehicle network (IVN); generate an information element comprising an indication of the attack; and broadcast the information element to a connected device via a vehicle-to-vehicle (V2X) network.

Example 2

The apparatus of example 1, comprising a radio, the instructions when executed by the processing circuitry cause the processing circuitry to broadcast the information element via the radio.

Example 3

The apparatus of example 2, the instructions when executed by the processing circuitry cause the processing circuitry to receive the notification from intrusion detection system (IDS) circuitry.

Example 4

The apparatus of example 2, comprising the IDS circuitry.

Example 5

The apparatus of example 1, the instructions when executed by the processing circuitry cause the processing circuitry to generate the information element comprising the indication of the attack and a request for help in recovering from the attack.

Example 6

The apparatus of example 5, the instructions when executed by the processing circuitry cause the processing circuitry to receive, via the V2X network, a response from the connected vehicle.

Example 7

The apparatus of example 6, the instructions when executed by the processing circuitry cause the processing circuitry to initiate recovery from the attack based in part on the response.

Example 8

The apparatus of example 7, the attack comprising a malicious message detected on the IVN, the malicious message comprising an indication of a physical characteristic.

Example 9

The apparatus of example 7, the response comprising an indication of the physical characteristic, the instructions when executed by the processing circuitry cause the processing circuitry to estimate the physical characteristic based in part on the response.

Example 10

A system, comprising: an in-vehicle-network (IVN); a plurality of electronic control units (ECUs) communicatively coupled via the IVN; intrusion detection system (IDS) circuitry coupled to the IVN, the IDS circuitry to identify an attack on the IVN; vehicle-to-vehicle (V2X) communication circuitry comprising a processor and memory, the memory comprising instructions that when executed by the processor cause the processor to: receive, from the IDS circuitry, a notification of the attack; generate an information element comprising an indication of the attack; and broadcast the information element to a connected vehicle via a vehicle-to-vehicle (V2X) network.

Example 11

The system of example 10, the V2X communication circuitry comprising a radio and an antenna, the instructions when executed by the processor cause the processor to broadcast the information element via the radio and the antenna.

Example 12

The system of example 10, the instructions when executed by the processor cause the processor to generate the information element comprising the indication of the attack and a request for help in recovering from the attack.

Example 13

The system of example 12, the instructions when executed by the processor cause the processor to receive a response from the connected vehicle via the V2X network.

Example 14

The system of example 13, the instructions when executed by the processor cause the processor to initiate recovery from the attack based in part on the response.

Example 15

The system of example 14, the attack comprising a one of the plurality of ECUs transmitting a malicious message on the IVN, the malicious message comprising an indication of a physical characteristic of the system.

Example 16

The system of example 15, the response comprising an indication of the physical characteristic, the instructions when executed by the processor cause the processor to estimate the physical characteristic based in part on the response.

Example 17

The system of example 10, the IVN comprising a controller area network (CAN) bus, CAN FD, a FlexRay bus, an automotive ethernet bus, or a local interconnected network (LIN) bus.

Example 18

At least one machine-readable storage medium comprising instructions that when executed by at least one processor, cause the at least one processor to: receive a notification of an attack on an in-vehicle network (IVN); generate an information element comprising an indication of the attack; and broadcast the information element to a connected vehicle via a vehicle-to-vehicle (V2X) network.

Example 19

The at least one machine-readable storage medium of example 18, the instructions, when executed, cause the at least one processor to broadcast the information element via a radio and an antenna.

Example 20

The at least one machine-readable storage medium of example 18, the instructions, when executed, cause the at least one processor to receive the notification from intrusion detection system (IDS) circuitry.

Example 21

The at least one machine-readable storage medium of example 18, the instructions, when executed, cause the at least one processor to identify the attack.

Example 22

The at least one machine-readable storage medium of example 18, the instructions, when executed, cause the at least one processor to generate the information element comprising the indication of the attack and a request for help in recovering from the attack.

Example 23

The apparatus at least one machine-readable storage medium of example 22, the instructions, when executed, cause the at least one processor to receive a response from the connected vehicle via the V2X network.

Example 24

The at least one machine-readable storage medium of example 23, the instructions, when executed, cause the at least one processor to initiate recovery from the attack based in part on the response.

Example 25

The at least one machine-readable storage medium of example 18, the attack comprising a malicious message detected on the IVN, the malicious message comprising an indication of a physical characteristic, the response comprising an indication of the physical characteristic, the instructions, when executed, cause the at least one processor to estimate the physical characteristic based in part on the response.

Example 26

A method, comprising: receiving a notification of an attack on an in-vehicle network (IVN); generating an information element comprising an indication of the attack; and broadcasting the information element to a connected vehicle via a vehicle-to-vehicle (V2X) network.

Example 27

The method of example 26, comprising: broadcasting the information element via a radio and an antenna.

Example 28

The method of example 26, the instructions, when executed, cause the at least one processor to receive the notification from intrusion detection system (IDS) circuitry.

Example 29

The method of example 26, the instructions, when executed, cause the at least one processor to identify the attack.

Example 30

The method of example 26, the instructions, when executed, cause the at least one processor to generate the information element comprising the indication of the attack and a request for help in recovering from the attack.

Example 31

The method of example 30, the instructions, when executed, cause the at least one processor to receive a response from the connected vehicle via the V2X network.

Example 32

The method of example 31, the instructions, when executed, cause the at least one processor to initiate recovery from the attack based in part on the response.

Example 33

The method of example 26, the attack comprising a malicious message detected on the IVN, the malicious message comprising an indication of a physical characteristic, the response comprising an indication of the physical characteristic, the instructions, when executed, cause the at least one processor to estimate the physical characteristic based in part on the response.

Example 34

An apparatus, comprising means arranged to implement the function of any one of examples 26 to 33.

What is claimed is:

1. An apparatus, comprising:
   intrusion detection system (IDS) circuitry arranged to couple to an in-vehicle network (IVN) and detect an attack on the IVN;
   processing circuitry coupled to the IDS circuitry; and
   memory coupled to the processing circuitry, the memory comprising instructions that when executed by the processing circuitry cause the processing circuitry to:
   receive from the IDS circuitry, a notification of the attack on the IVN;
   generate an information element comprising an indication of the attack and a request for help in recovering from the attack, the attack comprising a malicious message detected on the IVN, the malicious message comprising an indication of data;
   broadcast, via wireless communication circuitry, the information element to a connected vehicle via a vehicle-to-vehicle (V2X) network;
   receive, via the V2X network, a response from the connected vehicle, the response comprising an indication of a physical characteristic;
   initiate recovery from the attack based in part on the response; and
   estimate corrected data based in part on the physical characteristic.

2. The apparatus of claim 1, the wireless communication circuitry comprising a radio, the instructions when executed by the processing circuitry cause the processing circuitry to broadcast the information element via the radio.

3. A system, comprising:
   an in-vehicle-network (IVN);
   a plurality of electronic control units (ECUs) communicatively coupled via the IVN;
   intrusion detection system (IDS) circuitry coupled to the IVN, the IDS circuitry to identify an attack on the IVN by one of the ECUs; and
   vehicle-to-vehicle (V2X) communication circuitry comprising a processor and memory, the memory comprising instructions that when executed by the processor cause the processor to:
   receive, from the IDS circuitry, a notification of the attack;
   generate an information element comprising an indication of the attack and a request for help in recovering from the attack, the attack comprising a malicious message detected on the IVN, the malicious message comprising an indication of data;
   broadcast the information element to a connected vehicle via a vehicle-to-vehicle (V2X) network;
   receive, via the V2X network, a response from the connected vehicle, the response comprising an indication of a physical characteristic;
   initiate recovery from the attack based in part on the response and
   estimate corrected data based in part on the physical characteristic.

4. The system of claim 3, the V2X communication circuitry comprising a radio and an antenna, the instructions when executed by the processor cause the processor to broadcast the information element via the radio and the antenna.

5. The system of claim 3, the IVN comprising a controller area network (CAN) bus, CAN FD, a FlexRay bus, an automotive ethernet bus, or a local interconnected network (LIN) bus.

6. At least one non-transitory machine-readable storage medium comprising instructions that when executed by at least one processor, cause the at least one processor to:
  receive, from intrusion detection system (IDS) circuitry coupled to an in-vehicle network (IVN), a notification of an attack on the IVN;
  generate an information element comprising an indication of the attack and a request for help in recovering from the attack, the attack comprising a malicious message detected on the IVN, the malicious message comprising an indication of data;
  broadcast, via wireless circuitry the information element to a connected vehicle via a vehicle-to-vehicle (V2X) network;
  receive, via the V2X network, a response from the connected vehicle, the response comprising an indication of a physical characteristic;
  initiate recovery from the attack based in part on the response; and
  estimate corrected data based in part on the physical characteristic.

7. The at least one non-transitory machine-readable storage medium of claim 6, the wireless circuitry comprising a radio and an antenna.

\* \* \* \* \*